United States Patent
Babuka et al.

[11] Patent Number: 6,097,455
[45] Date of Patent: Aug. 1, 2000

[54] FLAT PANEL DISPLAYS HAVING TILES AND VISUALLY IMPERCEPTIBLE GAPS THEREBETWEEN

[75] Inventors: Robert Babuka, Vestal; Raymond G. Greene, Ovid, both of N.Y.; John P. Koons, Warrenton, Va.; Lester Mayes, Endicott, N.Y.; Donald P. Seraphim; Dean W. Skinner, both of Vestal, N.Y.

[73] Assignee: Rainbow Displays Inc., Endicott, N.Y.

[21] Appl. No.: 09/461,060

[22] Filed: Dec. 14, 1999

Related U.S. Application Data

[62] Division of application No. 09/322,047, May 28, 1999.
[51] Int. Cl.[7] .............................. G02F 1/133; G02F 1/13; G02F 1/1333
[52] U.S. Cl. ............................ 349/73; 349/187; 349/158
[58] Field of Search ............................ 349/73, 187, 190, 349/153, 158; 345/76, 903; 156/304.1

[56] References Cited

U.S. PATENT DOCUMENTS

| | | | |
|---|---|---|---|
| 5,056,893 | 10/1991 | Holz et al. ................................. | 349/73 |
| 5,106,197 | 4/1992 | Ohuchida et al. ......................... | 349/73 |
| 5,673,091 | 9/1997 | Boisdron et al. .......................... | 349/73 |
| 5,748,268 | 5/1998 | Kalamansh ................................ | 349/47 |
| 5,838,405 | 11/1998 | Izumi et al. ................................ | 349/73 |
| 5,867,236 | 2/1999 | Babuka et al. ............................. | 349/73 |
| 5,889,568 | 3/1999 | Seraphim et al. ......................... | 349/73 |
| 5,903,328 | 5/1999 | Greene et al. ............................. | 349/73 |

*Primary Examiner*—William L. Sikes
*Assistant Examiner*—Tarifur R. Chowdhury
*Attorney, Agent, or Firm*—Salzman & Levy

[57] ABSTRACT

The present invention features methods for assembling arrays of AMLCD tiles into tiled, flat-panel displays having visually imperceptible seams between the tiles. Flowable, polymeric adhesive layers are used between a back substrate, various optical components such as masks and polarizers, the tiles, and a front cover plate. Several unique techniques for establishing and maintaining tile-to-tile registration during assembly of the tiled, flat-panel display are presented.

18 Claims, 8 Drawing Sheets

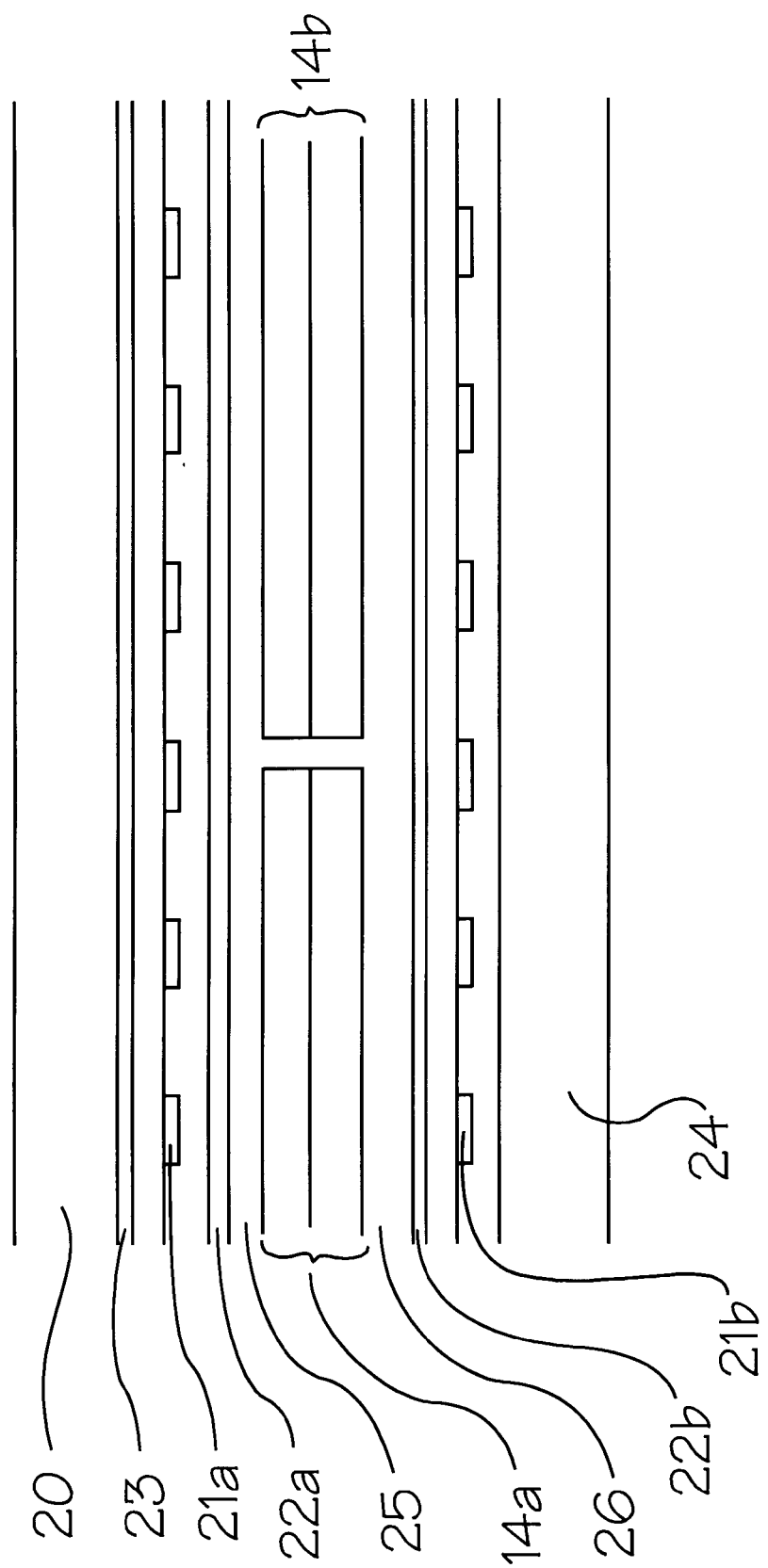

FLAT PANEL DISPLAYS HAVING TILES AND VISUALLY IMPERCEPTIBLE GAPS THEREBETWEEN

RELATED APPLICATION

The present patent application is a divisional of application Ser. No. 09/322,047, filed May 28, 1999 and related to U.S. Pat. No. 5,661,531, granted on Aug. 26, 1997, for Tiled Flat Panel Displays, assigned to the common assignee and hereby incorporated by reference.

FIELD OF THE INVENTION

This invention pertains to the manufacture of flat panel electronic displays and, more particularly, to the manufacture of AMLCD type, flat-panel displays assembled from arrays of tiles, while maintaining tolerances in three dimensions.

BACKGROUND OF THE INVENTION

Images on electronic displays are derived from an array of small, picture elements known as pixels. In color displays, these pixels comprise three color elements that produce the primary colors, for example, red, blue and green (R, B and G). Usually arranged in rectangular arrays, these pixels can be characterized by a pixel pitch, P, a quantity that measures the spacing of pixels in one direction. A typical cathode-ray tube (CRT) display used for computer applications has a pixel pitch have a pixel array width:height ratio of 4:3. Typical, standardized arrays in computer displays are composed of 640×480 (VGA), 800×600 pixels (SVGA), or 1024×780 pixels (XGA).

Large displays can be constructed of a plurality of adjacent tiles, with each having a single pixel or an array thereof. Such assembled tiled displays contain visually disturbing seams, resulting from the gaps between adjacent pixels on adjacent tiles. Such seams may incorporate interconnect, adhesives, seals, mechanical alignment means and other components resulting in optically visible discontinuities in displayed images. Some of these structures are described in the aforementioned U.S. Pat. No. 5,661,531. As a consequence, the image portrayed on seamed displays appears segmented and disjointed. Therefore, it is desirable to fabricate tiled, flat-panel displays which do not have noticeable or perceptible seams under the intended viewing conditions.

The pixel pitch in electronic displays must be set so that a continuous image is produced when the display is viewed at distances greater than the minimum viewing distance. For example, with a pixel pitch of P=0.3 mm. the minimum viewing distance is on the order of 1 m. Even though the minimum viewing distance increases in proportion to the pixel pitch, it still limits the pixel pitch for most computer and consumer displays. Since space for the tiling functions must be provided in spaces smaller in size compared to the pixel pitch, it is difficult to develop structures and methods for constructing tiled displays.

Flat-panel displays (FPDs) provide the best choice for constructing "seamless", tiled screens. Flat-panel displays include back lighted and self-lighted displays. Liquid crystal displays (LCDs) are the most common back lighted displays. Flat-panel displays depend on the micro fabrication of key components that carry the pixel patterns. Such micro fabrication techniques, however, are not viable for very large displays, generally greater than 20 inches diagonal, due to the fact that the manufacturing yield declines rapidly with increasing area of the display. Therefore, the inventors have determined that tiles with arrays of pixels can be micro fabricated and then assembled together to form a larger electronic display.

The present invention provides unique designs and methods for achieving such large, seamless, tiled panels for color or gray-scale displays. This invention particularly focuses on displays of the transparent, light valve type. In such displays, light from a uniform, backlight source is transmitted through the display assembly and directly viewed from the front side of the display. The light valves control the amount of primary light rays transmitted through each of the color elements in the pixels. The viewer's eyes merge the primary light from the pixels to form a continuous image at a sufficient viewing distance.

Because of a number of secondary processes, low-level light emanates from the phenomena include reflection and light guiding, all of which must be kept to a minimum in order to achieve sufficient brightness and contrast. The spaces between pixels on the same tile and the spaces between pixels on adjacent tiles have different structures. Consequently, the presence of seams between the pixels at the edge of the tiles will affect both primary and secondary light rays, thus making the construction of seamless, tiled displays more difficult.

In addition to the optical and electronic correction means the inventors have identified three design principles in assembling large-size, seamless, flat panels that may be viewed as though they were single monolithic displays:

a) the pixel pitch on the view plane for the tiles must be matched to that of the pixel pitch on the view plane between the tiles within a critical set of tolerances;

b) the primary light paths through the light valves must not be substantially affected by the presence of the seam or any other structures or components used in the tile assembly; and c) the inter-pixel gaps must be designed so that intratile and inter-tile pixel gaps, which have different physical structures, present approximately the same visual appearance to the viewer under both transmitted and reflected light.

This has largely been accomplished by applying the technology disclosed in the U.S. Pat. No. 5,661,531 in fabricated, tiled AMLCD functional models. However, design improvements are possible to increase the manufacturing yield and the optical performance of the tiled displays from their component tile parts. This invention focuses on preferred assemblies of the tiles into robust laminates between glass cover plates and back plates.

Tiled FPDs require a high degree of location precision and alignment in all three dimensions, X, Y, and Z, to appear monolithically, optically continuous, pixel to pixel, across seams between neighboring tiles. The means to achieve AMLCD tiled FPDs in this invention requires referencing the tiles along the Z dimension with adhesive films of preferred thickness. The tiles are spaced by the films between continuous, optically flat, cover and back plates, having matched indices of refraction. At the same time, the horizontal and vertical dimensions of the FPD tiles are maintained, locating the pixels across the seams with continuity in pitch and parallelism, by optical means and by the use of these preferred polymer film spacers. Compliant, adhesive films in the range of 25 to 250 microns in thickness, and optimized in compliance, are used to bond the tiles to the cover and back plates without inadvertently stressing the tiles and deforming the cell gap. The air is controllably purged at the meniscus of the adhesive interface by using an assembly machine which actually bends the adhesive coated glass cover and back plates to a critical radius while attaching the adhesive to the tiles. The glass back or cover plates may be a standard such as 1737 commonly used in the AMLCD industry. Thickness standards are 0.5 mm, 0.7 mm and 1.1 mm. For these tiling assemblies any of these glasses may be used. The thinner glasses allow smaller radius to be used in the adhesive extrusion process. This makes a robust laminated assembly with continuity of refractive index, and well matched thermal expansion to the standard glass tile materials.

Previously used apparatus for forming the laminated composite have applied the adhesive in liquid form in a puddle followed by squeezing to meet an approximate thickness specification. This was a slow and expensive process, due to the need for highly sophisticated precision machines, in conjunction with aligning or fiducial marks, to control the X, Y, and Z dimensions over the large areas of the entire FPD. In this current design and process, however, locations are more precise by pixel to pixel location at the tile edges without the loss of tolerance customary in fiducial optical location systems. The gain in tolerance may be applied to improving the aperture ratio of the pixels and/or line resolution of the tiled display. Alternatively, for the same resolution and aperture ratio, a wider seal at the tile edges may be used to increase the yield of the tiles. The process yield and speed of the assembly processes are significantly increased over the methods of the prior art.

SUMMARY OF THE INVENTION

In accordance with the present invention, a design and assembly method are provided to locate precisely and adhesively bond, along X, Y, and Z dimensions, a set of AMLCD tiles between glass cover and back plates. It is a preferable manufacturing strategy to work with fully tested and/or inspected and yielded good sub-assemblies. Accordingly, the preferred cover plate sub-assembly may contain a mask and adhesive with polymer film on the bottom side to face the tiles. The polarizer and top side of the cover plate sub-assembly. The preferred back plate sub-assembly contains a mask and adhesive polymer film on the side facing the tiles and a polarizer on the opposite side. Making these types of sub-assemblies is common in the industry. An example is the process for rolling polarizers onto an AMLCD flat panel with manufacturing tools common to the industry.

Alternatively, the sub-assemblies may contain the polarizers on the inside of the cover and back plates. However, since this arrangement places the masks further away from the seam between the tiles by the thickness of the polarizer, material compatibility issues are complicated in this type of sub-assembly.

The preferred process sequence is to: a) align the tiles, b) align the back plate sub-assembly to the tiles, c) laminate the back plate subassembly to the tiles, d) align the cover plate sub-assembly to the tiles and e) laminate the cover plate sub-assembly to the tiles.

The tiles in the laminated 4-tile assembly may be viewed as if they were a single monolithic display.

BRIEF DESCRIPTION OF THE DRAWINGS

A complete understanding of the present invention may be obtained by reference to the accompanying drawings, when considered in conjunction with the subsequent detailed description, in which:

FIG. 8 is a cross-sectional, schematic view of an alternate embodiment of a tiled, flat-panel assembly having optical components inside the front and/or back cover plates.

DETAILED DESCRIPTION OF THE PREFERRED EMBODIMENT

Generally speaking, the present invention pertains to the manufacturing of tiled, flat-panel displays and, more specifically, to specific hardware structures and assembly methods which allow the creation of flat-panel displays with visually imperceptible seams.

Figure 1:
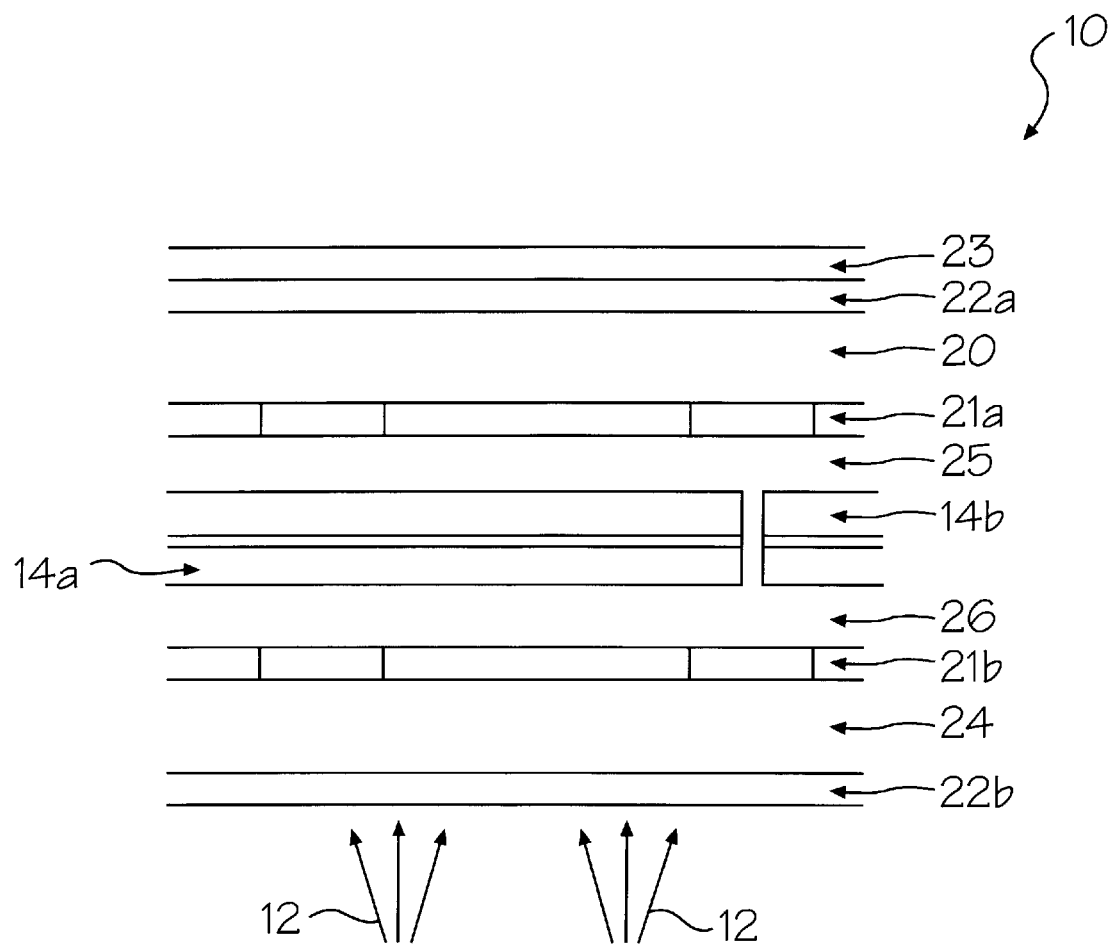
FIG. 1 is a cross-sectional, schematic view of a portion of a tiled FPD.

A cross section view of the inventive assembled laminate 10 is shown in FIG. 1. A cover plate 20 contains a mask 21*a* on one side and a polarizer 22*a* on the opposite side, as shown. A screen 23 is adhesively bonded to the polarizer 22*a*. A back plate 24 contains a second mask 21*b* on one side and a polarizer 22*b* on the opposite side. Back plate 24 generally consists of optically flat glass having a thickness in the range of approximately 0.5 mm to 2.0 mm. Tiles 14*a*, 14*b* are sandwiched between the cover plate 20 and back plate 24 and adhesively bonded to them with films of compliant polymer, shown respectively at reference numerals 25 and 26. An array of n×m tiles may be constructed, although the preferred embodiment features a 2×2 tile array (i.e., tiles A, B, C and D). Light (arrows 12) from a light box (not shown) enters the assembled laminate structure 10 with a desired distribution of collimating angles.

Figure 2:
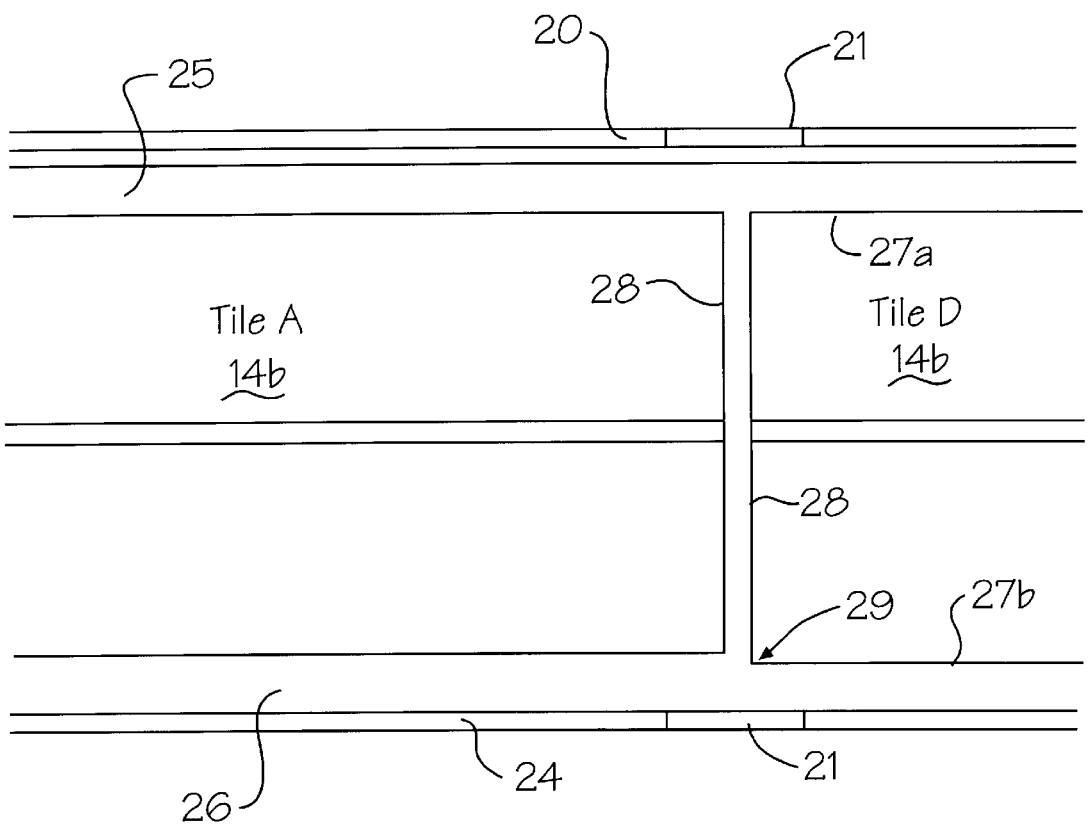
FIG. 2 is a detailed, cross-sectional view of a seam region of the tiled, FPD shown in FIG. 1.

Referring now to FIG. 2, the polymer film materials 25 and 26 and their respective adhesive surfaces 27*a* and 27*b* are shown. These are significant to the performance of the display, contributing in several ways to the optical response thereof. First, the index of diffraction of film materials 25, 26 in combination with surfaces 27*a*, 27*b* is preferably well matched (less than 10% difference) to that of the glass of the tiles A, B, C, D and to that of the cover plate 20 and back plate 24, thereby minimizing the reflections and maintaining the highest practical efficiency of light transmission for a given angular distribution of incident light.

Second, the elastic modulus of the polymer 25, 26 is preferably very low, less than 10,000 psi, thereby contributing minimal stress on the tiles and also distributing stresses so that no discontinuities or significant gradients in cell gap occur. Such cell gap variations cause color shift at their immediate location. These variations may be visible and be considered defects by a viewer.

Third, the seam area 28 of the tiles 14*a*, 14*b* is particularly sensitive to showing optical artifacts, due to discontinuities in height between neighboring narrow seal edges. Therefore, the polymer adhesive material 25 and 26 and the process, which depend on the flow properties of the adhesive, are designed to compensate for height differences in the tiles 29. Thus, a smooth transition is achieved, optically, from tile to tile. Preferably, the thickness of the polymer films is uniform and in the range of 25 to 250 microns, including the adhesive surface. The polymer films may be (a) a single adhesive layer in the thickness range of 25 to 500 $\mu$m held in place by two peelable films, peeled during application; (b) a polymer solid film with low modulus (range of 500 to 2,000 psi) and with adhesive on both sides and peelable films covering the adhesive, also peeled during application; (c) an adhesive film previously laminated to the back plate but also with peelable film, peeled during application; or (d) a film squeegied onto either the tiles and/or the back plate and cover plate.

Fourth, the flow properties and wetting properties of the adhesive surface layer 27a, 27b are optimized for eliminating air from the interface, making the interface bubble free on completion of the lamination process.

All of the above aspects of the material, along with the actual lamination process, are significant in producing a laminate composite of tiles with desirable optical properties.

Figure 3:
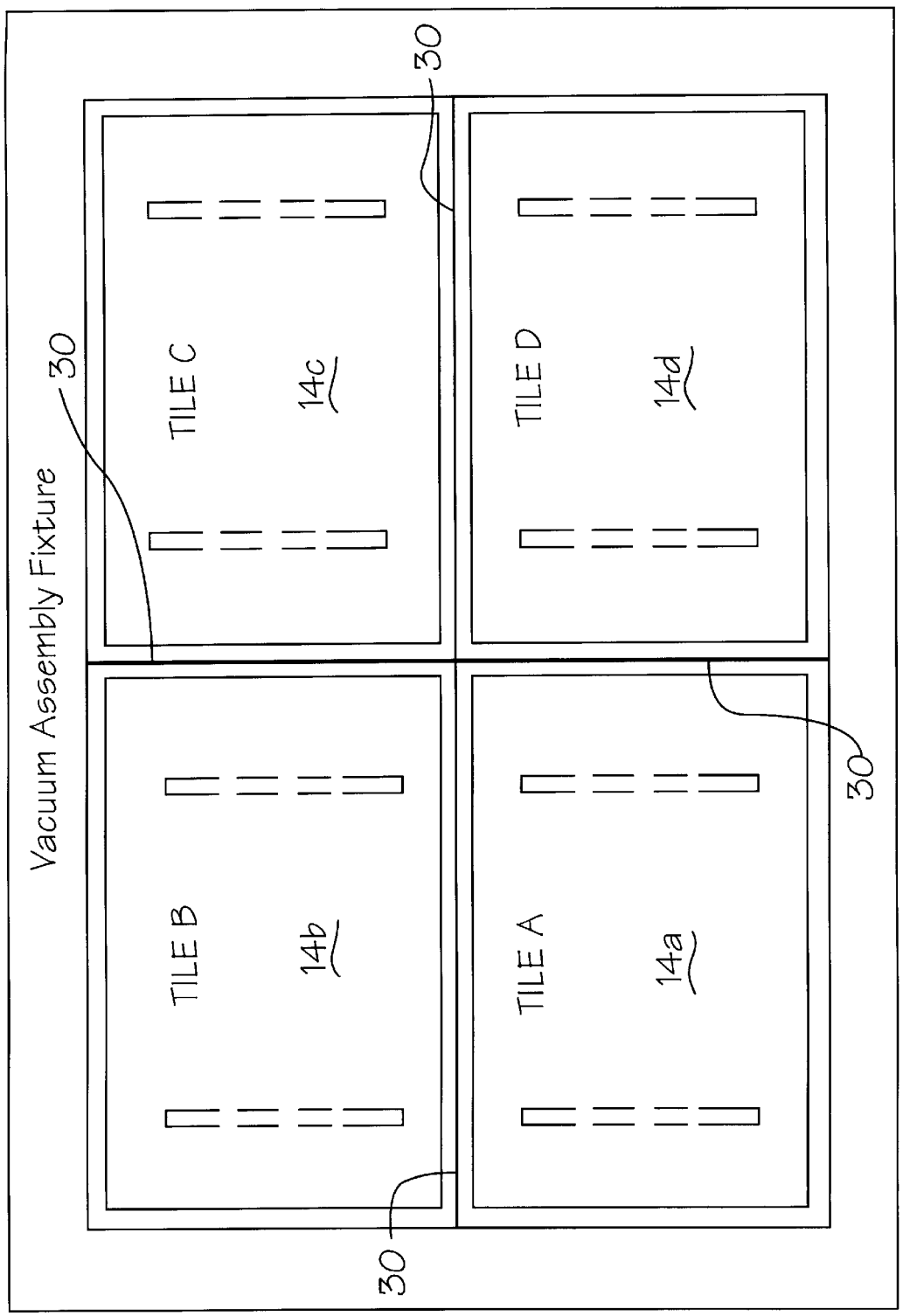
FIG. 3 is a schematic view of an assembly fixture utilizing a vacuum chuck used to align and assemble tiled FPDs.

The design and process, as shown and discussed herein, eliminate the need for a very complex assembly machine. Referring now to FIG. 3, there is shown a vacuum chuck fixture for locating the tiles optically, pixel to pixel, on a bench with the aid of vacuum chucks 1, 2, 3 and 4, to hold tiles 14a, 14b, 14c and 14d firmly in place. Without the constraint of using fiducials, the precision machined edges of the tiles 14a, 14b, 14c and 14d, which can be located with respect to the pixels within tolerances of a few microns, can be butted together, minimizing the gap between them. The spacing between the glass edges 28 of the tiles 14a, 14b, 14c and 14d is determined by a thin polymer film 30, which prevents the glass edges from chipping during butting, due to contact with each other. This allows achieving gaps between tile edges in the range of less than 15 microns, rather than the 50 microns design limits of the prior art. The capability for making higher resolution displays and/or higher aperture ratios with more efficient light transmission for tiled displays results from this method.

Figure 4:
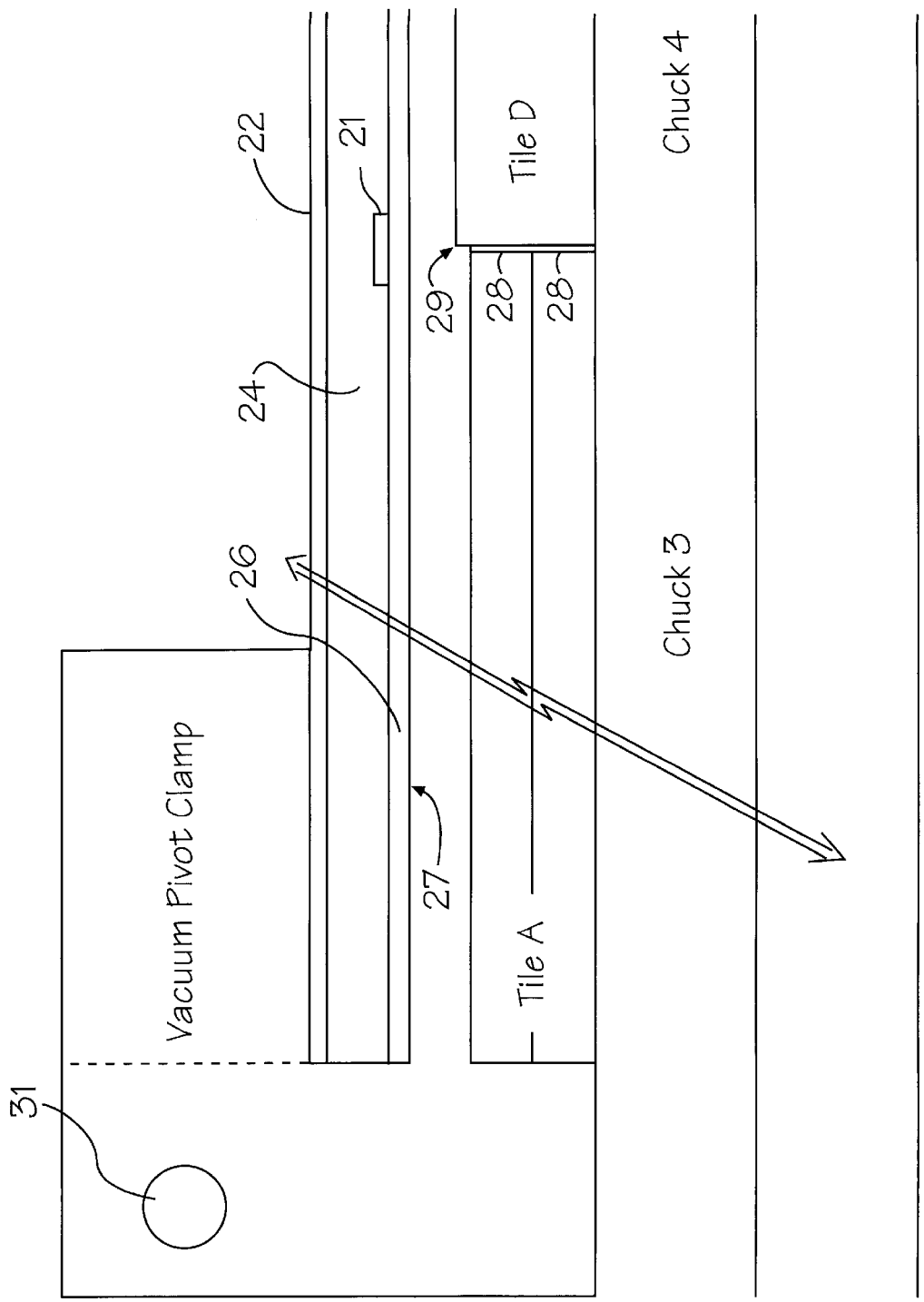
FIG. 4 is a detailed, cross-sectional view of a portion of a tile held in the fixture shown in FIG. 3.
Figure 5:
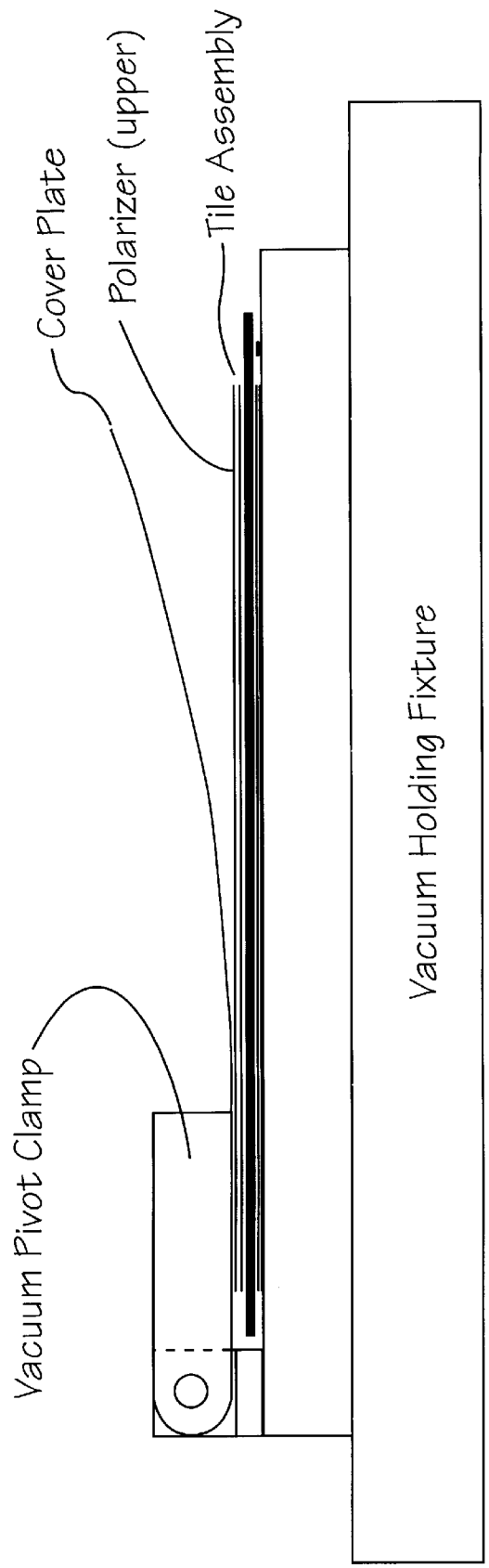
FIG. 5 is a schematic view of the fixture shown in FIG. 3 holding a tile assembly with its cover plate flexed.

For example, the four-tile assembly sequence and procedure, described herein, has importance in achieving the desired results, but other process sequences may also be practical. The vacuum assembly fixture shown in FIG. 3 holds four tiles 14a, 14b, 14c and 14d, which are initially located on a pixel-to-pixel basis with respect to neighboring tiles, with the sides which face the back plate 24 being face up. Referring now also to FIG. 4, a back plate 24 is shown, containing the mask 21b and polymer film 26 facing the tiles 14a, 14b, 14c and 14d, hinged by vacuum assembly fixtures, and still protected by a peelable cover sheet. The back plate 24 is hinged by pivot 30 down to the surface of the tiles 14a, 14b, 14c and 14d and the mask grid 21b is accurately located to the dark spaces between the pixels. Mask 21b can alternatively be located to a set of fiducial S (not shown) on the tiles 14a, 14b, 14c and 14d in both X and Y directions. Next, the back plate 24 is hinged out, maintaining its edge axis location. An enlarged, cross-sectional view is shown in FIG. 5.

Figure 6:
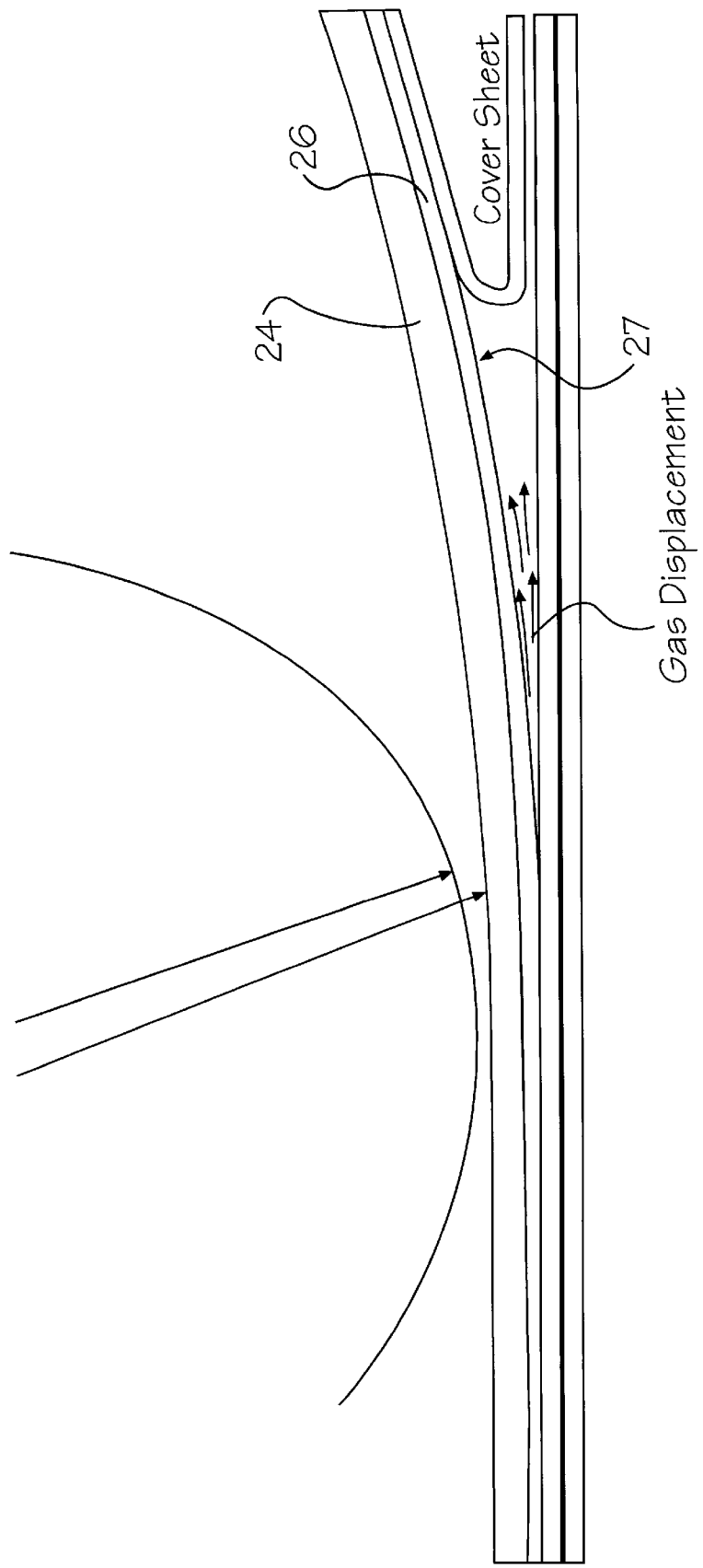
FIG. 6 is a detailed, cross-sectional view of a seal region of a tile assembly showing a back plate flexed to a desired radius.
Figure 7:
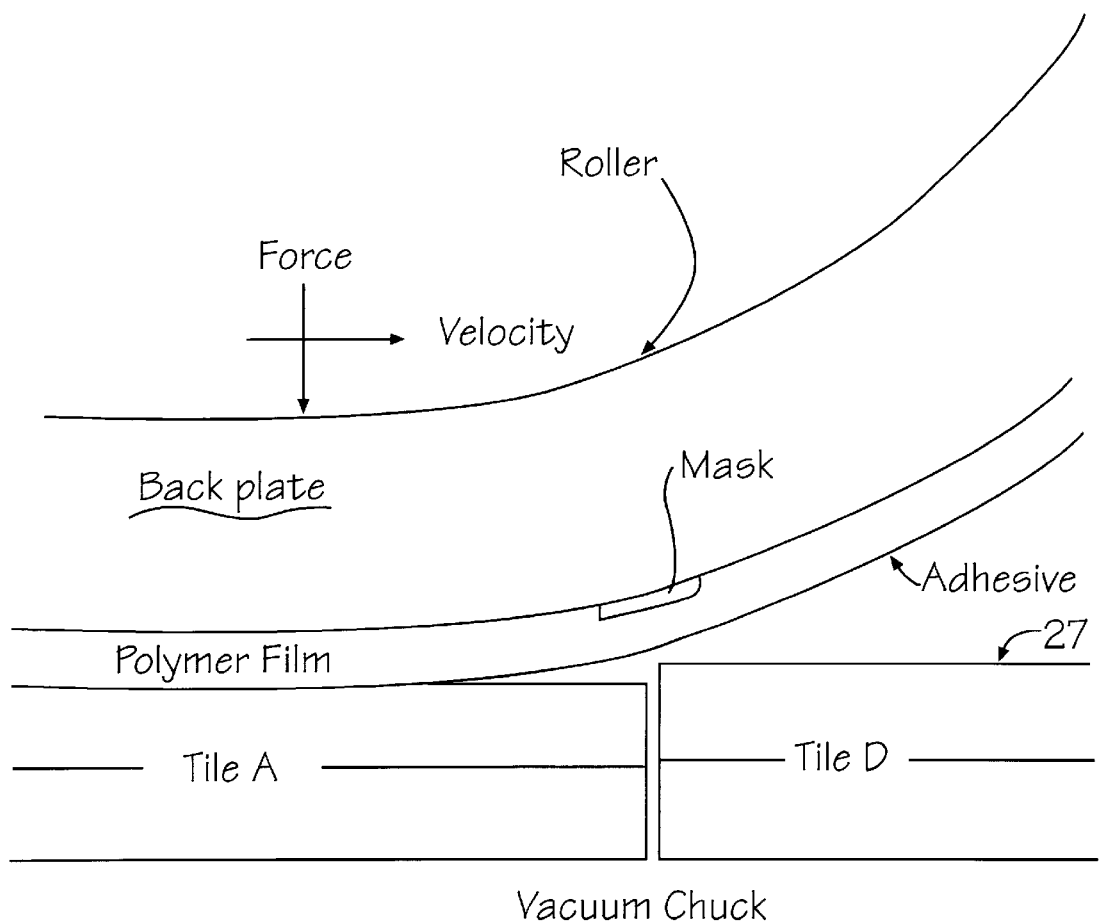
FIG. 7 is a detailed, cross-sectional view of a seam region between two tile assemblies showing the adhesive meniscus formed during the application of a back plate subassembly.

Referring now to FIGS. 6 and 7, the back plate subassembly 21, 24, 26 is next rolled into place. The roll radius and the velocity are dependent on the wetting rate and the viscosity of the adhesive surface. This sequence and surface location referencing leaves the top surface of the tiles, which face the cover plate 24, with surface planarity continuity across the seam. The back plate 24 referencing has a height difference 29, but stresses are smoothly transitioned from tile to tile.

The flow of the liquid film between the polymer bounding surface and the tiles is different and superior to the prior art which describes bonding between two solid rigid bonding surfaces. Both uniform gap and lubrication type problems have been studied in depth and reported in the literature. These studies are useful as a starting point for finite element modeling. In this current preferred tiling process, a highly flexible conformable wall (the polymer film) forms a bounding surface that interacts mechanically with the fluid within the narrow space between tiles and back plate. The motion of the bounding wall responding to the roller applying pressure to the cover plate or back plate (FIGS. 6 and 7) provides the redistribution (flow) of the liquid while rejecting air that is initially adjacent to the liquid film.

In summary, the importance of the innovations in this disclosure are several. First, there is provision in the seam locations and over the entire surface of the tiles for a substantial stress free or stress relaxing interface in a glass-polymer film-tiled AMLCD-polymer film-glass laminated assembly composite. The thickness of the films may be minimized and still maintain very low stresses by employing low elastic modulus materials such as silicones. The thinner films are a desirable compromise so that the masks on the insides of the back plates and cover plates are maintained as close as possible to the tiles to hide the optical effects of the seam. But the thickness and choices of adhesive are chosen to adequately surmount the discontinuous steps in thickness of the tile edges without impacting the cell gap near the seam. A further benefit of the use of these polymer films and the lamination assembly is that any residual bowing of the tiles prior to assembly is practically eliminated. This decreases color non-uniformity in the tiled display.

Secondly, the location technique is very significant in minimizing the spacing between apertures at the tile edges. Since all apertures must be the same, a monolithic mask is used on the back and cover plates to cover the optical impact of the seam and the lack of a mask in the image source plane in the space between the tile edges. The glass edge location may be manufactured to a precision of a few microns, thus the technique of using spacers between the edges at the seam to minimize the seam discontinuity is important. The monolithic masks are further reduced according to how well the apertures at the seam are located. An additional benefit of the precise location ability at the seam is an improvement in color continuity and a decrease in the magnitude of the color correction necessary by the use of electronics. Lighting efficiency is thereby improved since all color corrections work only by decreasing the background intensity.

The reductions in masking open up the aperture ratios for the image source plane and the image view plane. Furthermore, since the optical response at the seam is improved by the smaller gap there, the cone angles achieved in the incident light may also be reduced, thereby increasing the light efficiency by an additional amount.

The tiles are held in register to each other and to the back plates and cover plates during the laminate assembly process by unique apparatus, FIG. 6. When thin wetting adhesive layer 27 (FIG. 7) is also applied to the tiles.

Lamination of the cover plate subassembly is the very similar to the process previously described for lamination of the back plate sub-assembly. The polymer spacer film and adhesive, however, may be thinner since the tiles have already been made planar on their front surface in the previously described process sequence a of a,b,c,d and e. A thinner polymer spacer film brings the mask closer to the seams thus making the seams less visible to the viewer.

Referring now to FIG. 8, there is shown a cross-sectional, schematic view of the seam region of an alternate embodiment of a tile assembly. In this embodiment, screen 23, polarizer 22a and mask 21a are included between tiles 14a, 14b and cover plate 20. In addition, a second polarizer 22b and mask 21b are included between the tiles 14a, 14b and back plate 24. This optical stack arrangement is desirable because the very compliant cell gaps are buffered from the less-compliant layers by low-modulus polymer adhesive films 15, 26. For example, polymer film 25 separates polarizer 22a from the top surface of tiles 14a, 14b thereby minimizing stresses on tiles 14a, 14b. Other optical components which may need buffering are masks 21a, 21b and screen 23. This optical stack construction in which the space between polarizing layers 22a, 22b and tile 14a, 14b front and rear surfaces, respectively provides high contrast ratios. In addition, this stack arrangement avoids handling damage to screen 23 since it is protected by cover plate 20. Other arrangements of optical components between tile 14a, 14b surfaces and the cover plate 20 and/or back plate 24 are possible and may be used to meet particular operating circumstances.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what will be protected by Letters Patent is presented in the subsequently appended claims.

What is claimed is:

1. A tiled, flat-panel AMLCD display, comprising:
   a) at least two AMLCD tiles, each of said AMLCD tiles having front and back faces and containing a plurality of pixels, said pixels being located at a predetermined pixel pitch in at least one dimension, said AMLCD tiles being placed adjacent one another with a gap therebetween;
   b) spacing means placed in said gap between said AMLCD tiles such that the width of said gap is less than said pixel pitch;
   c) front, monolithic masking means fixedly attached to said front faces of said AMLCD tiles by first adhesive means;
   d) a cover plate fixedly attached to said front, monolithic masking means;
   e) back, monolithic masking means fixedly attached to said back faces of said AMLCD tiles by second adhesive means; and
   f) a back plate fixedly attached to said back, monolithic masking means, said back plate being a mounting substrate;
   such that when collimated light within a predetermined range of angles is projected through said tiled, flat-panel AMLCD display, said gap between said AMLCD tiles is visually imperceptible to a viewer at a predetermined viewing position.

2. The tiled, flat-panel AMLCD display as recited in claim 1, wherein said spacing means comprises polymer spacers having a predetermined thickness.

3. The tiled, flat-panel AMLCD display as recited in claim 2, wherein each of said AMLCD tiles comprises a glass layer having a predetermined index of refraction substantially equal to the index of refraction of said adhesive means.

4. The tiled, flat-panel AMLCD display as recited in claim 1, wherein said gap is less than 5% of said predetermined pixel pitch.

5. The tiled, flat-panel AMLCD display as recited in claim 1, wherein said first and said second adhesive means comprise films of compliant polymer having predetermined thicknesses.

6. The tiled, flat-panel AMLCD display as recited in claim 5, wherein said predetermined thickness of said first and said second compliant polymer film is in the range of approximately 25 μM to 500 μM and wherein said first and said second compliant polymer films have an elastic modulus in the range of approximately 1000 to 5000 psi.

7. The tiled, flat-panel AMLCD display as recited in claim 5, wherein said compliant polymer film comprises a single layer of adhesive carried between two peelable, protective films.

8. The tiled, flat-panel AMLCD display as recited in claim 5, wherein said compliant polymer film comprises layers of adhesive on both sides of a compliant carrier film, at least one of said adhesive-carrying sides of said compliant carrier film being protected by a peelable film.

9. The tiled, flat-panel AMLCD display as recited in claim 5, wherein said complaint polymer film comprises a layer of flowable adhesive placed onto at least one of said plates at the time of assembly by means of a predetermined process.

10. The tiled, flat-panel AMLCD display as recited in claim 9, wherein said predetermined process comprises a squeegee process.

11. The tiled, flat-panel AMLCD display as recited in claim 9, wherein each of said plurality of pixels has a defined aperture ratio of at least approximately 0.25.

12. The method for making a tiled, flat-panel AMLCD display as recited in claim 11, wherein said predetermined thickness of said first, compliant polymer film is in the range of approximately 25 μM to 500 μM in thickness and has an elastic modulus in the range of approximately 1000 to 5000 psi.

13. The tiled, flat-panel AMLCD display as recited in claim 1, wherein said front, monolithic mask is fixedly attached to said cover plate by a laminating process.

14. The tiled, flat-panel AMLCD display as recited in claim 1, wherein said back, monolithic mask is fixedly attached to said back plate by a laminating process.

15. The tiled, flat-panel AMLCD display as recited in claim 1, wherein said plurality of pixels of each of said AMLCD tiles comprises an array of pixels, the dimensions of each of said arrays being one from the group of 640×480 pixels, 512×390 pixels, 400×300 pixels, and 320×240 pixels.

16. A tiled, flat-panel AMLCD display, comprising:
   a) at least two AMLCD tiles, each of said AMLCD tiles having front and back faces and containing a plurality of pixels, said pixels being located at a predetermined pixel pitch in at least one dimension, said AMLCD tiles being placed adjacent one another with a gap therebetween;
   b) spacing means placed in said gap between said AMLCD tiles such that the width of said gap is less than said pixel pitch;
   c) front, monolithic masking means fixedly attached to said front faces of said AMLCD tiles by first adhesive means;

d) front polarizing means fixedly attached to said front, monolithic masking means;

e) a cover plate fixedly attached to said front polarizing means;

f) back, monolithic masking means fixedly attached to said back faces of said AMLCD tiles by second adhesive means; and g) a back plate fixedly attached to said back, monolithic masking means, said back plate being a mounting substrate;

such that when collimated light within a predetermined range of angles is projected through said tiled, flat-panel AMLCD display, said gap between said AMLCD tiles is visually imperceptible to a viewer at a predetermined viewing position.

17. The tiled, flat-panel AMLCD display as recited in claim 16, further comprising:

h) screen means interposed between said front polarizing means and said cover plate.

18. The tiled, flat-panel AMLCD display as recited in claim 16, further comprising:

i) rear polarizing means interposed between said back faces of said tiles and said back, monolithic masking means.

* * * * *